US010708920B2

(12) United States Patent
Kitazoe et al.

(10) Patent No.: US 10,708,920 B2
(45) Date of Patent: Jul. 7, 2020

(54) METHOD AND APPARATUS FOR DYNAMIC DEVICE CAPABILITY SIGNALING IN WIRELESS COMMUNICATIONS

(71) Applicant: QUALCOMM Incorporated, San Diego, CA (US)

(72) Inventors: Masato Kitazoe, Hachiouji (JP); Keiichi Kubota, Farnborough (GB); Valentin Alexandru Gheorghiu, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 14/788,335

(22) Filed: Jun. 30, 2015

(65) Prior Publication Data
US 2016/0262144 A1 Sep. 8, 2016

Related U.S. Application Data
(60) Provisional application No. 62/127,474, filed on Mar. 3, 2015.

(51) Int. Cl.
*H04W 72/04* (2009.01)
*H04W 76/10* (2018.01)
(Continued)

(52) U.S. Cl.
CPC ......... *H04W 72/048* (2013.01); *H04L 5/0057* (2013.01); *H04W 76/10* (2018.02);
(Continued)

(58) Field of Classification Search
CPC . H04W 72/048; H04W 76/046; H04W 76/02; H04W 8/22; H04W 88/02; H04W 76/10; H04W 76/27; H04L 5/0057
(Continued)

(56) References Cited

U.S. PATENT DOCUMENTS 8,090,369 B2    1/2012  Kitazoe
8,600,404 B2   12/2013  Shaw et al.
(Continued)

FOREIGN PATENT DOCUMENTS

EP      141862375.5    *  9/2014
GB         2497579 A      6/2013
(Continued)

OTHER PUBLICATIONS

International Search Report and Written Opinion—PCT/US2016/018962—ISA/EPO—dated Apr. 28, 2016.
(Continued)

*Primary Examiner* — Michael Y Mapa
(74) *Attorney, Agent, or Firm* — Loza & Loza, LLP/Qualcomm

(57) ABSTRACT

Methods and apparatuses of wireless communications are provided to dynamically determine capability information such that potential configuration and/or resource conflicts may be mitigated among multiple connections while one or more of on-going connections are not interrupted. A user equipment (UE) establishes one or more connections with a network. The UE allocates, in a first resource allocation, one or more resources of the UE to the one or more connections. The UE dynamically determines an instantaneous UE capability information (IUCI) of the UE in response to a change from the first resource allocation to a second resource allocation, the IUCI indicative of the capability of the UE during a predetermined time period. The UE transmits the IUCI to the network to mitigate potential resource allocation conflict among the one or more connections while maintaining at least one of the connections.

20 Claims, 15 Drawing Sheets

(51) Int. Cl.
   *H04W 76/27* (2018.01)
   *H04L 5/00* (2006.01)
   *H04W 8/22* (2009.01)
   *H04W 88/02* (2009.01)

(52) U.S. Cl.
   CPC .............. *H04W 76/27* (2018.02); *H04W 8/22* (2013.01); *H04W 88/02* (2013.01)

(58) Field of Classification Search
   USPC ........................... 455/450–452.2, 550.1, 561
   See application file for complete search history.

(56) References Cited

U.S. PATENT DOCUMENTS

| | | | |
|---|---|---|---|
| 8,855,654 | B2 | 10/2014 | Agarwal |
| 2009/0111467 | A1 | 4/2009 | Chai et al. |
| 2010/0130219 | A1* | 5/2010 | Cave ..................... H04W 72/02 455/450 |
| 2012/0113866 | A1 | 5/2012 | Tenny et al. |
| 2013/0136069 | A1* | 5/2013 | Baldemair .............. H04L 5/001 370/329 |
| 2013/0329665 | A1 | 12/2013 | Kadous et al. |
| 2014/0241220 | A1 | 8/2014 | Choi et al. |
| 2014/0378105 | A1 | 12/2014 | Suryavanshi |
| 2017/0171902 | A1* | 6/2017 | Tillman .................. H04W 8/24 |
| 2017/0280330 | A1* | 9/2017 | Martin .............. H04W 72/1215 |

FOREIGN PATENT DOCUMENTS

| | | |
|---|---|---|
| JP | 2014505416 A | 2/2014 |
| WO | 2008137582 A2 | 11/2008 |
| WO | 2012092851 A1 | 7/2012 |
| WO | 2013107155 A1 | 7/2013 |
| WO | 2016045909 A1 | 3/2016 |

OTHER PUBLICATIONS

New Postcom: "Discussion on Different Signalling Mechanisms for TDD UL-DL Reconfiguration", 3GPP TSG RAN WG1 #72, R1-130163, Internet http://www. 3gpp.org/ftp/tsg_ran/WG1_RL1/TSGR1_72/Docs/R1-130163.zip, Jan. 19, 2019, pp. 1-5.

Qualcomm Europe: "Change of UE Capability", 3GPP TSG RAN WG2 LTE RRC adhoc, R2-075544, Internet http://www.3gpp.org/ftp/tsg_ran/WG2_RL2/TSGR2_AHs/2007_12_RRC_LTE/Docs/R2-075544.zip, Dec. 14, 2007, pp. 1-4.

* cited by examiner

METHOD AND APPARATUS FOR DYNAMIC DEVICE CAPABILITY SIGNALING IN WIRELESS COMMUNICATIONS

CROSS-REFERENCE TO RELATED APPLICATION(S)

This application claims priority to and the benefit of U.S. Provisional Patent Application No. 62/127,474, filed on 3 Mar. 2015, the disclosure of which is expressly incorporated by reference herein in its entirety.

TECHNICAL FIELD

The technology discussed below relates generally to wireless communication systems, and more particularly, to dynamic device capability reporting in wireless communication systems.

INTRODUCTION

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

An example of a fourth generation (4G) telecommunication standard is Long Term Evolution (LTE). LTE is a set of enhancements to the UMTS mobile standard. It is designed to better support mobile broadband Internet access by improving spectral efficiency, lower costs, improve services, make use of new spectrum, and better integrate with other open standards using orthogonal frequency division multiple access (OFDMA) on the downlink (DL), single-carrier frequency divisional multiple access (SC-FDMA) on the uplink (UL), and multiple-input multiple-output (MIMO) antenna technology.

In 3G and 4G networks, a user equipment (UE) declares its capability information to a network using certain signaling messages. Based on the reported capability information (e.g., UE capability information), the network can configure a connection with a configuration or profile that can be supported by the available resources and reported capability of the UE. However, the capability information reporting schemes provided in current 3G/4G standards are fairly static (i.e., not dynamically updated) and can be improved to support multiple connectivity between a UE and a network. As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure provide methods and apparatuses that are configured to dynamically determine, signal, or update capability information such that potential configuration and/or resource conflicts due to resource reallocation may be mitigated among multiple connections while one or more of the on-going connections are not interrupted.

An aspect of the disclosure relates to a method of wireless communication operable at a user equipment (UE). The UE establishes one or more connections with a network. The UE allocates, in a first resource allocation, one or more resources of the UE to the one or more connections. The UE dynamically determines an instantaneous UE capability information (IUCI) of the UE in response to a change from the first resource allocation to a second resource allocation, the IUCI indicative of the capability of the UE during a predetermined time period. The UE transmits the IUCI to the network to mitigate potential resource allocation conflict among the one or more connections while maintaining at least one of the connections.

Another aspect of the disclosure relates to a method of wireless communication operable at a network node. The network node establishes one or more connections with a user equipment (UE). The network node allocate, in a first resource allocation, one or more resources of the network node to the one or more connections. The network node dynamically determines an instantaneous network capability information (INCI) of the network node in response to a change from the first resource allocation to a second resource allocation, the INCI indicative of the capability of the network node during a predetermined time period. The network node transmits the INCI to the UE to mitigate potential resource allocation conflict among the one or more connections while maintaining at least one of the connections.

Another aspect of the disclosure relates to a user equipment (UE) that includes a communication interface configured to establish one or more connections with a network, a memory including software, and at least one processor operatively coupled to the communication interface and the memory. The at least one processor when configured by or executing the software, includes a resource control block, a capability determination block, and a capability update block. The resource control block is configured to allocate, in a first resource allocation, one or more resources of the UE to the one or more connections. The capability determination block is configured to dynamically determine an instantaneous UE capability information (IUCI) of the UE in response to a change from the first resource allocation to a second resource allocation, the IUCI indicative of the capability of the UE during a predetermined time period. The capability update block is configured to transmit the IUCI to the network to mitigate potential resource allocation conflict among the one or more connections while maintaining at least one of the connections.

Another aspect of the disclosure relates to a network node that includes a communication interface configured to establish one or more connections with a user equipment (UE), a memory including software, and at least one processor operatively coupled to the communication interface and the memory. The at least one processor when configured by or executing the software, includes a resource control block, a capability determination block, and a capability update block. The resource control block is configured to allocate, in a first resource allocation, one or more resources of the network node to the one or more connections. The capability determination block is configured to dynamically determine an instantaneous network capability information (INCI) of the network node in response to a change from the first resource allocation to a second resource allocation, the INCI indicative of the capability of the network node during a predetermined time period. The capability update block is configured to transmit the INCI to the UE to mitigate potential resource allocation conflict among the one or more connections while maintaining at least one of the connections.

These and other aspects of the disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure provide methods and apparatuses that are configured to dynamically signal or update capability information such that potential configuration and/or resource conflicts may be mitigated among multiple connections. In some aspects of the disclosure, a UE or a network node may dynamically determine and update its capability information (e.g., instantaneous UE capability information or instantaneous network capability information) in response to changing resource allocation conditions such that one or more connections can be configured or reconfigured without resource conflict. By dynamically updating the capability information, an apparatus may continuously update its capability information without for example disconnecting and reconnecting the connections.

Figure 1:
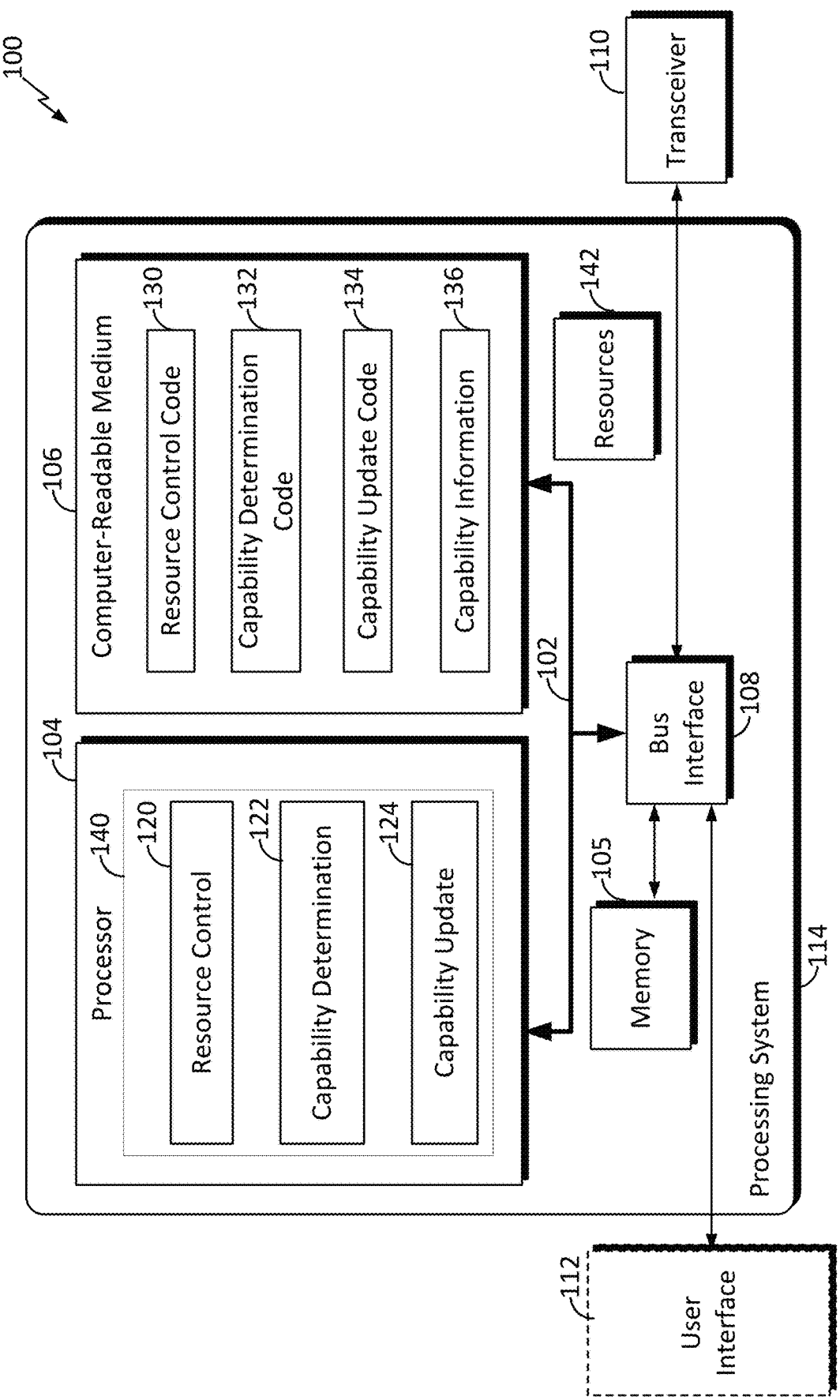
FIG. 1 is a block diagram illustrating an example of a hardware implementation for an apparatus employing a processing system in accordance with aspects of the disclosure.

FIG. 1 is a diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. In some aspects of the disclosure, a user equipment (UE) as illustrated in any one or more of FIGS. 2, 3, 5-8, 12 and/or 13 may be implemented with an apparatus 100. In some aspects of the disclosure, a network node (e.g., a Node B, an eNB, a radio network controller (RNC) or MME) as illustrated in any one or more of FIGS. 2, 3, 5-8, 12, and/or 13 may be implemented with an apparatus 100. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes and procedures described below and illustrated in FIGS. 7-10.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a communication interface for communicating with various other apparatuses over a transmission medium. In some aspects of the disclosure, the transceiver 110 may include one or more transmitters and/or one or more receivers, configured to communicate with one or more devices via one or more frequencies and/or networks. The transceiver 110 may be configured to support one or more radio access technology (RAT) such as GSM, W-CDMA, LTE, Bluetooth, Ultra-wideband, and WiFi or any suitable wireless technology. Depending upon the nature of the apparatus, a user interface 112 (e.g., keypad, display, speaker, microphone, joystick, touchpad, touchscreen, mouse) may also be provided.

In some aspects of the disclosure, when configured as a UE, the processor 104 may include an instantaneous UE capability information (IUCI) block (e.g., a capability information block 140) including various components and circuitry. The IUCI block may include a resource control block 120, a capability determination block 122, and a capability update block 124. The resource control block 120 may be configured to allocate one or more resources 142 of the UE to one or more connections with a network. The resource 142 may include communication channels (e.g., carriers, physical channels, logical channels), processing power, radio frequency resources, and memory space for buffering. A certain resource is allocated to a connection when the resource is wholly or partially dedicated to support communication functionality over the connection.

The capability determination block 122 may be configured to dynamically determine one or more instantaneous UE capability information (IUCI) 136 of the UE in response to a change in the allocation of the one or more resources (e.g., from a first resource allocation to a second resource allocation). The IUCI indicates the capability of the UE during a predetermined time period (e.g., one or more TTIs). The capability update block 124 may be configured to transmit the IUCI to the network to mitigate potential resource allocation conflict among the one or more connections while maintaining at least one of the connections with the network. The IUCI block and its functions will be described in more detail below.

In some aspects of the disclosure, when configured as a network node, the processor 104 may include an instantaneous network capability information (INCI) block (e.g., a capability information block 140) including various components and circuitry. The INCI block may include a resource control block 120, a capability determination block 122, and a capability update block 124. The resource control block 120 may be configured to allocate one or more resources 142 of the network node to one or more connections with a UE for example. The resource 142 may include communication channels (e.g., carriers, physical channels, logical channels), processing power, radio frequency resources, and memory space for buffering. A certain resource is allocated to a connection when the resource is wholly or partially dedicated to support communication functionality over the connection.

The capability determination block 122 may be configured to dynamically determine an instantaneous network capability information (INCI) 136 of the network node in response to a change in the allocation of the one or more resources. The INCI indicates the capability of the network node during a predetermined time period (e.g., one or more TTIs). The capability update block 124 may be configured to transmit the INCI to the UE to mitigate potential resource allocation conflict among the one or more connections while maintaining at least one the connections with the UE. The INCI block will be described in more detail below.

The processor 104 is responsible for managing the bus 102 and general processing, including the execution of software stored on the computer-readable medium 106. The software, when executed by the processor 104, causes the processing system 114 to perform the various functions described for any particular apparatus. In some aspects of the disclosure, the software may include an instantaneous UE capability information software for configuring the apparatus 100 to perform the functions and processes of a UE illustrated in FIGS. 7-13. In some aspects of the disclosure, the software may include an instantaneous network capability information software for configuring the apparatus 100 to perform the functions and processes of a network node illustrated in FIGS. 7-13. The software may include a resource control code 130, a capability determination code 132, and a capability update code 134. The resource control code 130 when executed configures one or more of the resource control block 120, capability determination block 122, and capability update block 124 to perform the functions illustrated in FIGS. 7-13. The capability determination code 132 when executed configures one or more of the resource control block 120, capability determination block 122, and capability update block 124 to perform the functions illustrated in FIGS. 7-13. The capability update code 134 when executed configures one or more of the resource control block 120, capability determination block 122, and capability update block 124 to perform the functions illustrated in FIGS. 7-13.

The computer-readable medium 106 may also be used for storing data that is manipulated by the processor 104 when executing software. In some examples, instantaneous UE capability information (e.g., capability information 136) may be stored at the computer-readable medium 106 when the apparatus 100 is implemented as a UE. In some examples, instantaneous network capability information (e.g., capability information 136) may be stored at the computer-readable medium 106 when the apparatus 100 is implemented as a network node.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The various concepts presented throughout this disclosure may be implemented across a broad variety of telecommunication systems, network architectures, and communication standards. In various aspects of the disclosure, a UE may be configured to support multiple connections with the same network node or different network nodes simultaneously. Throughout this disclosure, a connection between a UE and a network node is established when UE and/or network resources are allocated to enable the connection for communicating user data and/or control data between the UE and the network node. Non-limiting examples of the resources 142 include communication channels, carriers, physical channels, logical channels, processing power, processing at baseband, processors, radio frequency resources, resource blocks, radio transmission power, and memory space for buffering. For example, the network nodes may belong to the same network or different networks. Non-limiting examples of these networks include 3G cellular networks, 4G cellular networks, local wireless networks (e.g., Wi-Fi network), Bluetooth networks, Ultra-wideband networks, or any suitable networks. The apparatus may be configured to dynamically determine, declare, or update its capability information for each connection in response to changing resource allocation (e.g., resources 142) for supporting the multiple connections such that potential configuration conflict between the connections may be avoided or mitigated.

Figure 2:
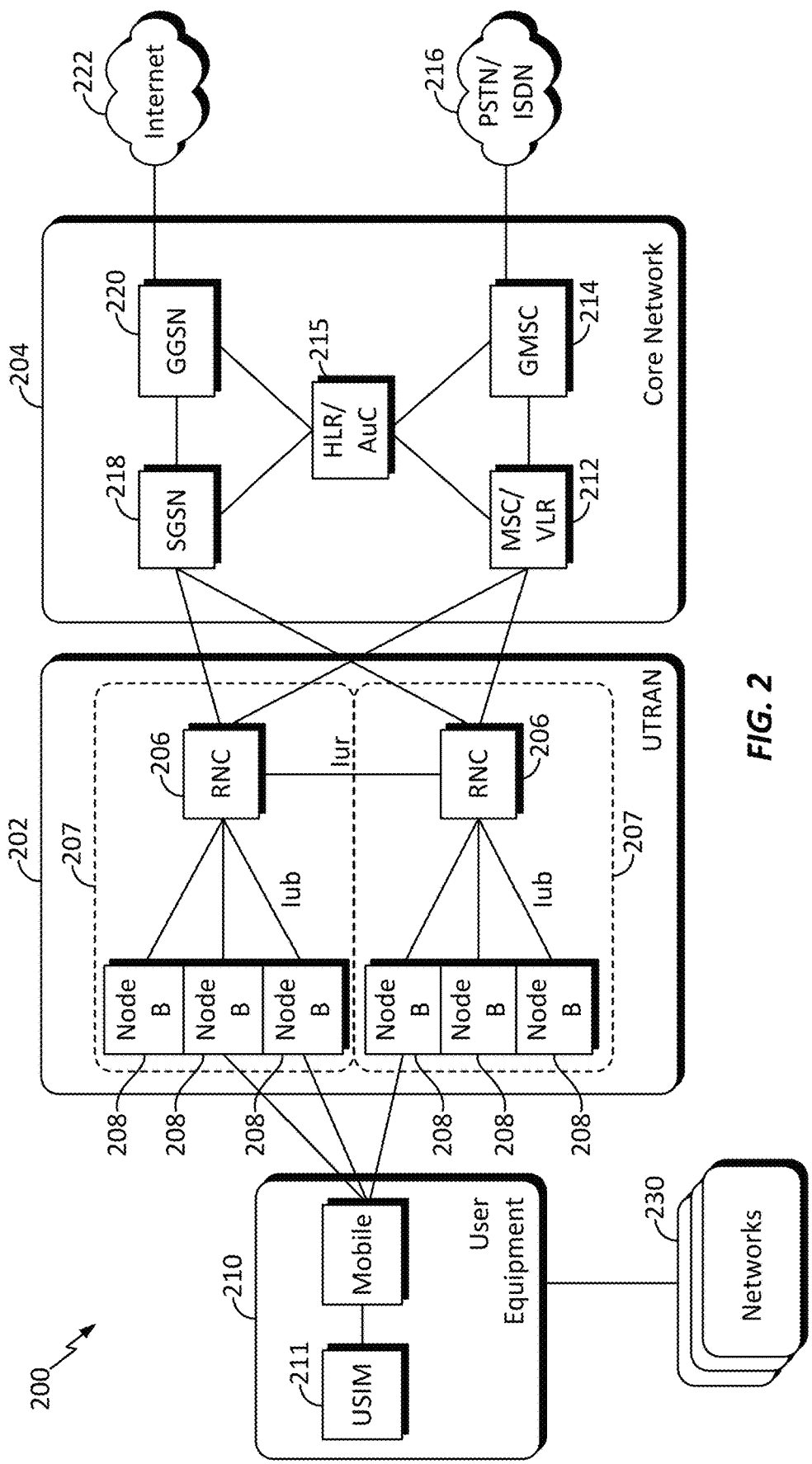
FIG. 2 is a block diagram illustrating an example of a telecommunications system in accordance with aspects of the disclosure.

Referring now to FIG. 2, as an illustrative example without limitation, various aspects of the present disclosure are illustrated with reference to a Universal Mobile Telecommunications System (UMTS) system 200. A UMTS network, which is an example of a 3G network, includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a data card, a USB dongle, a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a mobile router or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208. The UE 210 may also communicate with one or more other networks 230 (e.g., a 4G network, a 5G network, Wi-Fi, Bluetooth).

The core network 204 can interface with one or more access networks, such as the UTRAN 202 and an E-UTRAN. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS)

domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with an MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
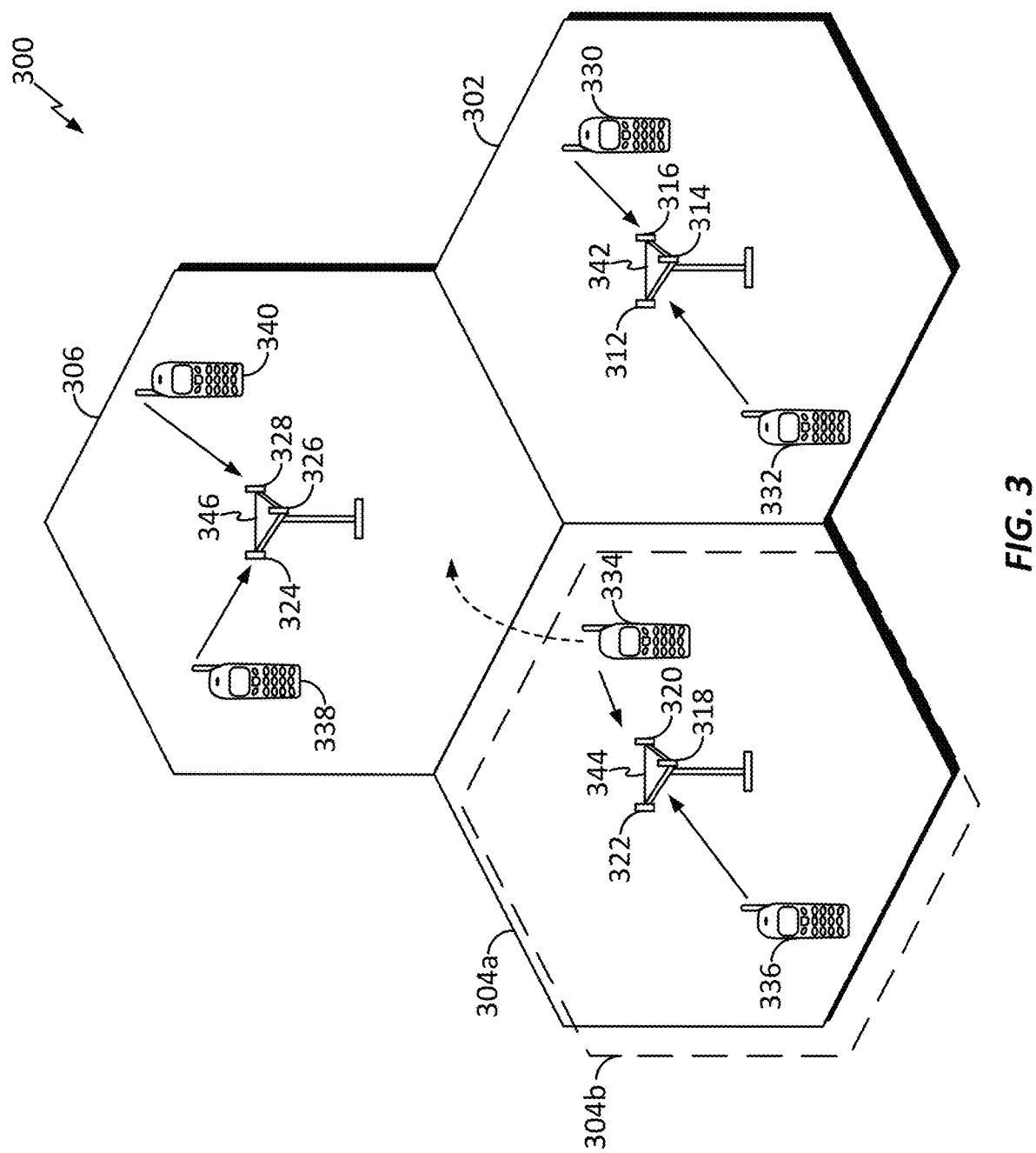
FIG. 3 is a diagram illustrating an example of an access network in accordance with aspects of the disclosure.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

The UMTS system 200 may also provide a high speed packet access (HSPA) air interface that includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
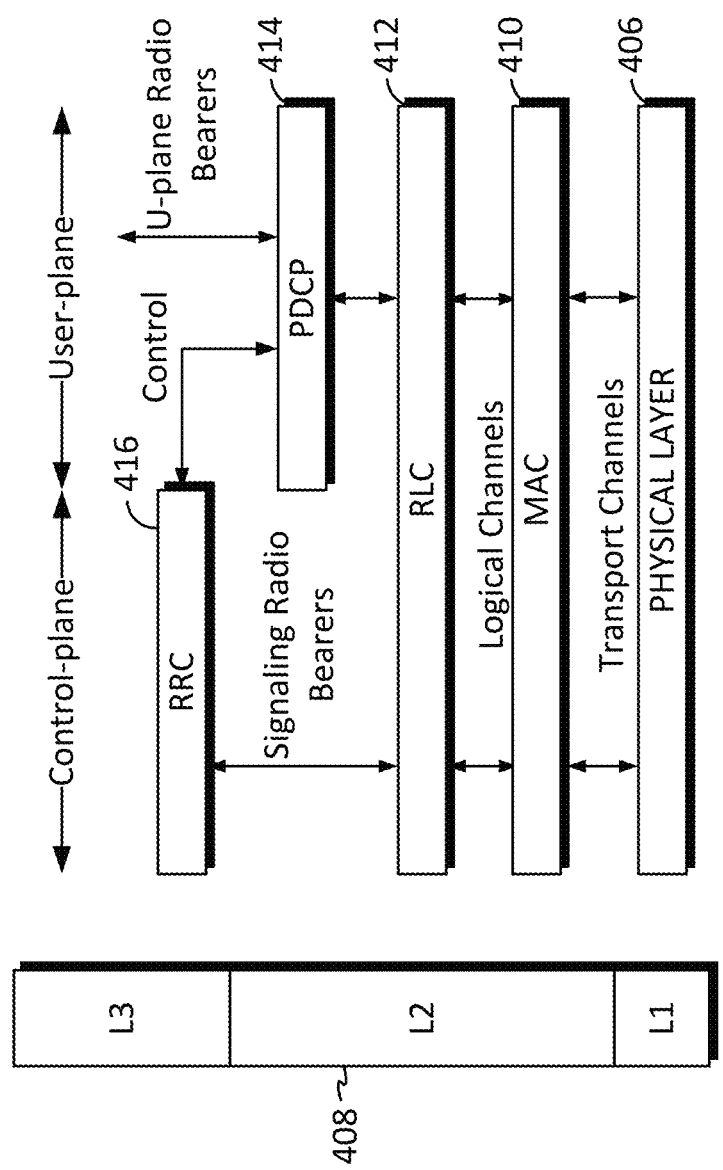
FIG. 4 is a diagram illustrating an example of a radio protocol architecture for the user and control plane in accordance with aspects of the disclosure.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and the Node B 208 over the physical layer 406.

At Layer 3, an RRC layer 416 handles the control plane signaling between the UE 210 and the Node B 208. The RRC layer 416 includes a number of functional entities for routing higher layer messages, handling broadcasting and paging functions, establishing and configuring radio bearers, Radio Resource Control (RRC) connections, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets, security by ciphering the data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources in one cell among the UEs. The MAC sublayer 410 is also responsible for HARQ operations.

In some aspects of the disclosure, the MAC sublayer 410 may include various MAC entities, including but not limited to a MAC-d entity and MAC-hs/ehs entity. The Radio Network Controller (RNC) houses protocol layers from MAC-d and above. For the high speed channels, the MAC-hs/ehs layer is housed in the Node B.

From the UE side, The MAC-d entity is configured to control access to all the dedicated transport channels, to a MAC-c/sh/m entity, and to the MAC-hs/ehs entity. Further, from the UE side, the MAC-hs/ehs entity is configured to handle the HSDPA specific functions and control access to the HS-DSCH transport channel. Upper layers configure which of the two entities, MAC-hs or MAC-ehs, is to be applied to handle HS-DSCH functionality.

In some aspects of the disclosure, a UE may transmit IUCI as one or more PHY (physical layer) signals, MAC PDUs, RLC PDUs, or PDCP PDUs. In some aspects of the disclosure, a network node (e.g., an RNC, a Node B, an eNB, an MME) may transmit INCI as one or more PHY (physical layer) signals, MAC PDUs, RLC PDUs, or PDCP PDUs.

Figure 5:
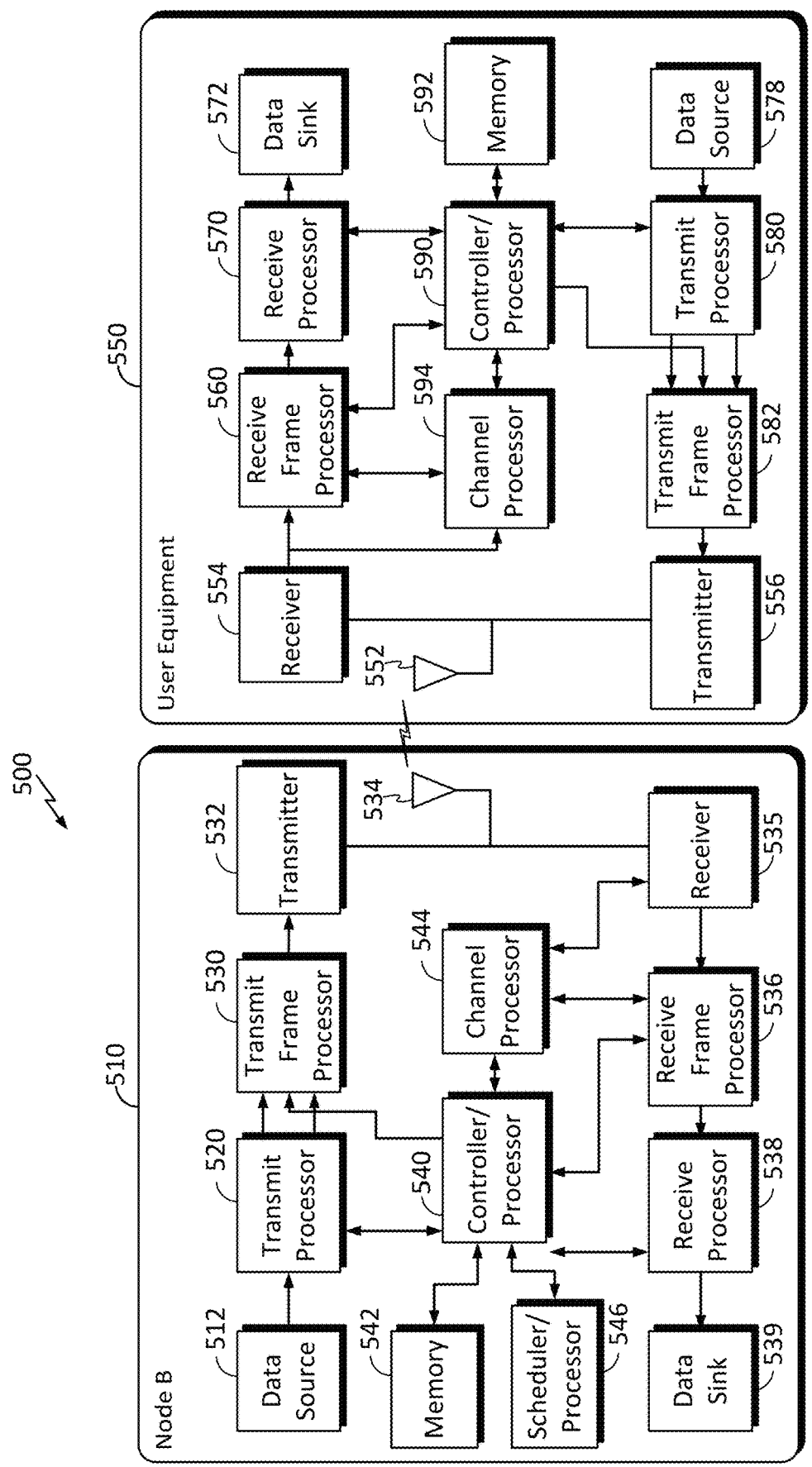
FIG. 5 is a block diagram illustrating an example of a Node B in communication with a user equipment (UE) in a telecommunications system in accordance with aspects of the disclosure.

FIG. 5 is a block diagram of an exemplary Node B 510 in communication with an exemplary UE 550, where the Node B 510 may be any of the Node Bs in FIGS. 2 and 3, and the UE 550 may be any of the UEs in FIGS. 1-3, 6-8, 12, and 13. In the downlink communication, a transmit processor 520 may receive data from a data source 512 and control signals from a controller/processor 540. The data source 512 may provide instantaneous network capability information to be transmitted in the downlink transmission. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including MIMO antennas, beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). The data source 578 may provide the instantaneous UE capability information to be transmitted in the uplink transmission. Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552. The controller/processor 590 may also allocate resources of the UE to one or more connections with one or more network nodes.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Figure 6:
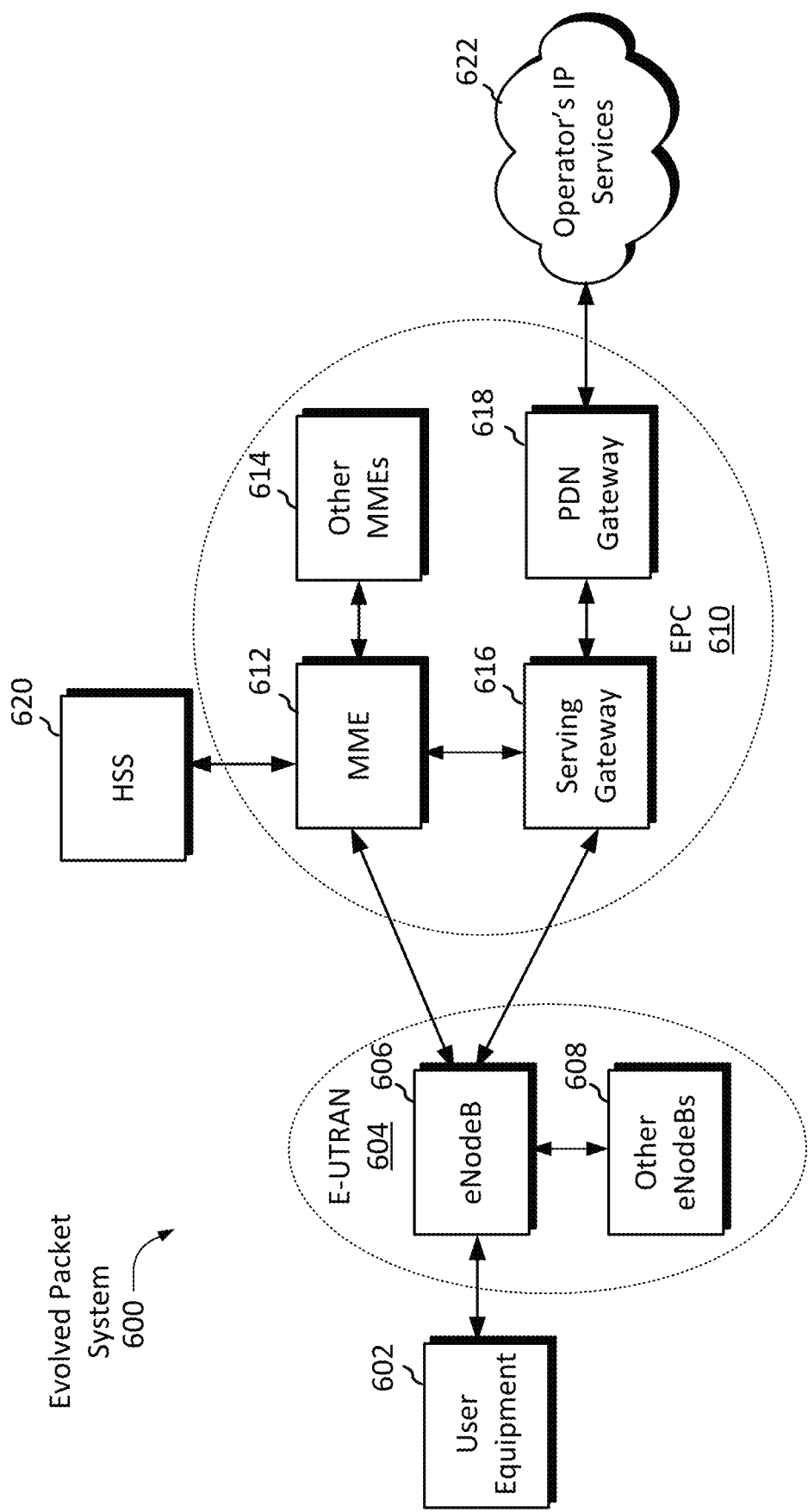
FIG. 6 is a diagram illustrating an LTE network architecture in accordance with aspects of the disclosure.

FIG. 6 is a diagram illustrating an LTE network architecture 600 employing various apparatuses in accordance with aspects of the disclosure. The LTE network architecture 600 may be referred to as an Evolved Packet System (EPS) 600 or a 4G network. The EPS 600 may include one or more user equipment (UE) 602, an Evolved UMTS Terrestrial Radio Access Network (E-UTRAN) 604, an Evolved Packet Core (EPC) 610, a Home Subscriber Server (HSS) 620, and an Operator's IP Services 622. The UE 602 may be the same as the UE 210. The EPS can interconnect with other access networks (e.g., a UMTS system 200), but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 606 and other eNBs 608. The eNB 606 provides user and control plane protocol terminations toward the UE 602. The eNB 606 may be connected to the other eNBs 608 via an X2 interface (i.e., backhaul). The eNB 606 may also be referred to by those skilled in the art as a base station, a base transceiver station, a radio base station, a radio transceiver, a transceiver function, a basic service set (BSS), an extended service set (ESS), or some other suitable terminology. The eNB 606 provides an access point to the EPC 610 for a UE 602. Examples of UEs 602 include a cellular phone, a smart phone, a session initiation protocol (SIP) phone, a laptop, a personal digital assistant (PDA), a mobile router, a data card, a USB dongle, a satellite radio, a global positioning system, a multimedia device, a video device, a digital audio player (e.g., MP3 player), a camera, a game console, or any other similar functioning device. The UE 602 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a smartwatch, an Internet-of-thing device, a wearable connected device, a client, or some other suitable terminology.

The eNB 606 is connected by an S1 interface to the EPC 610. The EPC 610 includes a Mobility Management Entity (MME) 612, other MMEs 614, a Serving Gateway 616, and a Packet Data Network (PDN) Gateway 618. The MME 612 is the control node that processes the signaling between the UE 602 and the EPC 610. Generally, the MME 612 provides bearer and connection management. All user IP packets are transferred through the Serving Gateway 616, which itself is connected to the PDN Gateway 618. The PDN Gateway 618 provides UE IP address allocation as well as other functions. The PDN Gateway 618 is connected to the Operator's IP Services 622. The Operator's IP Services 622 include for example the Internet, the Intranet, an IP Multimedia Subsystem (IMS), and a PS Streaming Service (PSS).

Figure 14:
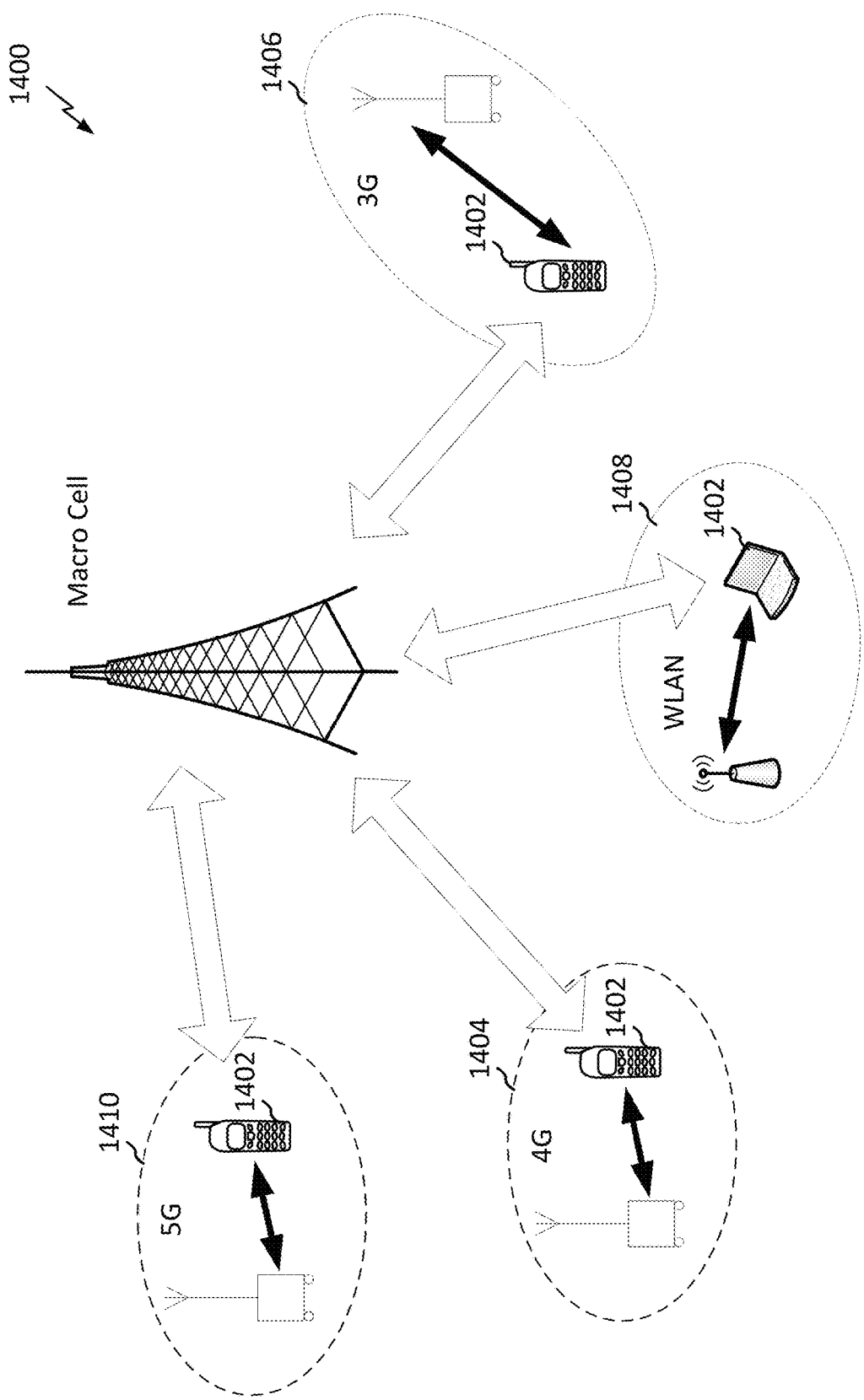
FIG. 14 is a diagram illustrating a 5G network in accordance with an aspect of the disclosure.

In some aspects of the disclosure, a wireless communications system or network may include all or some components of the UMTS system 200 and EPS 600 shown in FIGS. 2 and 6. However, the present disclosure is not limited to UMTS and EPS. For example, the wireless communications system may be a 5G network. The 5G network may be a mobile communications network with capabilities beyond those of the current 3G and 4G standards. FIG. 14 is an example of a 5G network 1400 in accordance with an aspect of the disclosure. Referring to FIG. 14, a 5G network 1400 may include disparate or heterogeneous connections utilizing different radio access technologies including 3G, 4G, 5G, WiFi, Bluetooth, unlicensed bands, etc. The 5G network 1400 can leverage the multiple connections to provide seamless connectivity for a 5G device 1402 (e.g., a UE or access terminal). The 5G network 1400 may include for example an LTE network 1404, a UMTS network 1406, a WiFi 1408, and a 5G network 1410. In some examples, the 5G network 1410 may utilize radio access technology below and/or above the 6 GHz frequency band (e.g., millimeter wave). In some examples, a UE (e.g., UE 210 or UE 602) may establish multiple connections with a network by utilizing the UTRAN 202 and/or E-UTRAN 604. The UE may dynamically signal its UE capability to the network for each connection in response to its resources allocated to the connections. In some aspects of the disclosure, a network node (e.g., an eNB, a Node B, an RNC, or an MME) may dynamically signal its capability to the UE based on, for example, its resource allocation for multiple connections with the UE and other UEs.

Figure 7:
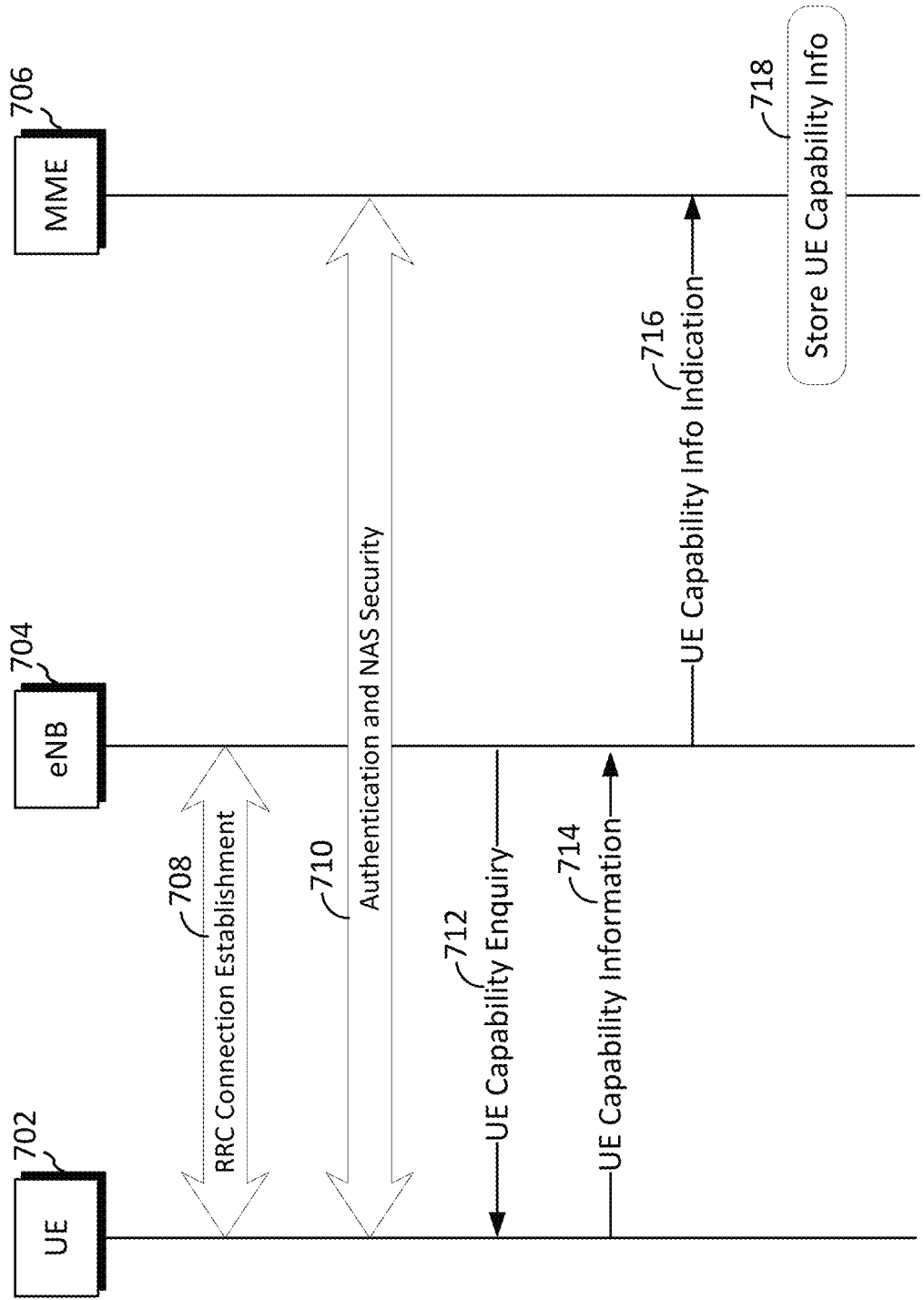
FIG. 7 is a flow diagram illustrating an example of UE capability information signaling procedure in an LTE network in accordance with aspects of the disclosure.

FIG. 7 is a flow diagram illustrating a UE capability information signaling procedure in an Evolved Packet System (EPS) in accordance with aspects of the disclosure. A UE 702 may exchange signaling messages with an eNB 704 and/or an MME 706. The UE 702 may be any of the UEs illustrated in FIGS. 1-3, 5-8, 12 and/or 13 such as the UE 602 of FIG. 6. The eNB 704 may be the same as the eNB 606 of FIG. 6. The MME 706 may be the same as the MME 612 of FIG. 6. Before the UE 702 can utilize the EPS for communication, it performs a synchronization process. It is followed by as a random access procedure in which the network for the first time knows that the UE is trying to get access, and the network provides temporary resources to the UE for initial communication. Once the random access procedure is successfully completed, the UE can perform an RRC connection establishment procedure 708 to configure the signal radio bearers between the UE and the network.

After RRC connection establishment 708, the UE 702 performs authentication and non-access stratum (NAS) security 710 procedures with the network. To obtain UE capability from the UE 702, the eNB 704 may transmit a UE Capability Enquiry message 712 to the UE 702, instructing the UE to report its capabilities. In response, the UE 702 may report its capability via a UE Capability Information message 714. Then, the eNB 704 may report the UE capability information to the MME 706 by a UE Capability Info Indication message 716.

In an EPS network, the MME 706 may store 718 the UE capability information provided by the UE, and the MME 706 can provide the UE capability information to a serving eNB (e.g., eNB 704) of a connected UE for the subsequent RRC connection establishments when the UE capability information for the UE is available in the MME 706. However, such UE capability information update is not flexible or fairly static in currently known implementations. For example, 3GPP Technical Specification 23.401 subclause 5.11.2 specifies "UE radio capability update" is only supported for changes of GERAN (GSM EDGE Radio Access Network) radio capabilities in ECM-IDLE (ECM refers to "EPS Connection Management" and ECM-IDLE is a state of ECM). Any change in the UE's E-UTRAN capabilities causes the UE to detach and then re-attach to the system. However, aspects of the present disclosure provide a dynamic capability information update procedure that may be implemented at a UE or a network node.

Figure 8:
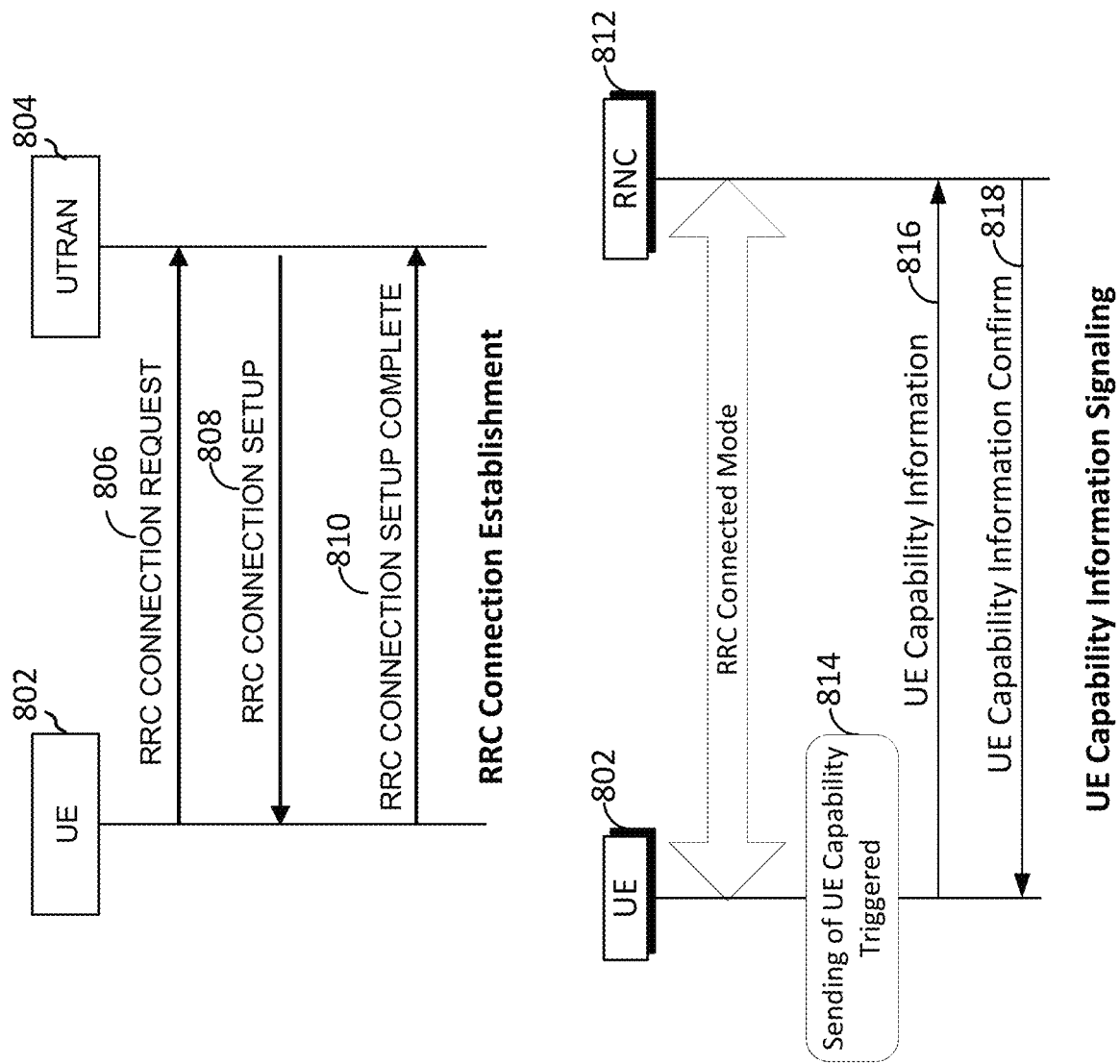
FIG. 8 is are flow diagrams illustrating a UE capability information signaling procedure in a UMTS network in accordance with aspects of the disclosure.

FIG. 8 is a drawing illustrating a UE capability information reporting procedure during RRC connection establishment in a UMTS network in accordance with some aspects of the disclosure. A UE 802 and a UTRAN 804 exchange an RRC Connection Request message 806, an RRC Connection Setup message 808, and an RRC Connection Setup Complete message 810, in order to establish an RRC connection between the UE 802 and UTRAN 804. The UE 802 may be the same as the UE 210 of FIG. 2. The UTRAN 804 may be the same as the UTRAN 202 of FIG. 2. In a UMTS network, the UE 802 can report its UE capability information during the RRC connection establishment procedure. In addition, the UE 802 can report its UE capability information in a UE capability information signaling procedure in some situations.

In a UMTS network, an RNC 812 stores the UE capability information when received, and the UE 802 may update the UE capability information via a UE capability information procedure in the RRC connected mode. While in the RRC connected mode, the UE 802 can utilize the wireless network for communications. However, there are certain limitations on the UE capability information update procedure in currently known implementations. Typically, a UE in the RRC connected mode can indicate changes in its UE capability in certain Information Elements (IEs) such as "DL capability with simultaneous HS-DSCH configuration," "transport channel capability," "physical channel capability," "device type," and "UE power class extension" within "RF capability extension." The UE avoids requesting a capability update that would render an existing circuit-switched (CS) configuration invalid or inoperable (e.g., see 3GPP TS 25.331 document in subclause 8.1.6.2, Release 12, which is incorporated herein by reference). In one example, when a UE is triggered to send or transmit its UE capability 814, the UE may transmit a UE capability information message 816 to the RNC 812 via a uplink (UL) Dedicated Control Channel (DCCH). In response, the RNC 812 transmits a UE Capability Information Confirm message 818 as an acknowledgment.

The above-described UE capability information update schemes or procedures may be implemented in typical 3G/4G networks. However, in these schemes, the reported UE capability information is fairly static and is updated only in certain limited situations (i.e., not dynamically updated). For example, in a typical LTE network, UE capability information is reported to the network (e.g., E-UTRA, EPS 600, etc.) at the time of network attachment and remains unchanged until for example reattachment, hence UE capability information is fairly static. In general, E-UTRA allows UE capability information to be updated only through detach and re-attach procedures.

In various aspects of the disclosure, a UE may establish one or more connections with a network or network nodes. For example, the network may include some or all portions of the UMTS system 200 of FIG. 2, EPS 600 of FIG. 6, and other suitable radio access networks. The UE can dynamically determine an instantaneous UE capability information (IUCI) of the UE in response to a change in the allocation of UE resources for the connections. Dynamically determining an IUCI is different from the static and inflexible UE capability update of the known methods that typically allow UE capability update or reporting only during connection establishment or certain limited situations. In accordance with various aspects of the disclosure, a UE can dynamically determine and report an IUCI after connection establishment while a connection is maintained at any suitable time intervals in response to changes in resource allocation at the UE. The IUCI may indicate the capability of the UE during a current TTI or a certain number of predetermined TTIs. The UE can transmit the IUCI to a network node (e.g., Node B, eNB, RNC, and MME) to mitigate potential resource allocation conflict among the connections while maintaining the connections. Similar techniques may be applied at a network node (e.g., Node B, eNB, RNC, and MME) to dynamically determine an instantaneous network capability information (INCI) that can be transmitted to one or more UEs.

UE capabilities for different supported features may be signaled independently, while in reality the UE may share its resources for realizing those features. In one example, a UE is capable of supporting three downlink (DL) carrier aggregation (CA) and Further enhanced Inter-Cell Interference Coordination (FeICIC), but the UE may not be able to support both features simultaneously (e.g., three DL CA and FeICIC) due to resource allocation conflict. For example, the number of RF chains utilized for their simultaneous operation exceeds the number of RF chains available at the UE. Moreover, generally known UE or network capability information update schemes (e.g., UE capability updates in UMTS networks) do not consider resources or features for supporting other radio access technology. In one example, a UE may share an RF chain or circuitry to access both a cellular network (e.g., UMTS/LTE) and a wireless local area network (WLAN or Wi-Fi network) in a time-shared manner. In some scenarios, the UE may desire to temporarily change the reported UE capabilities due to different resources allocation. In some examples, the UE may report updated UE capabilities when the processing capability of the UE is limited or reduced due to various reasons. For example, the UE may be executing certain feature-rich applications that demand a significant amount of processing power. A bus congestion may occur due to a significant amount of data being transferred to the display of the UE. The UE may experience a high temperature alarm due to sustained high processing demand. In some examples, when the UE has a low battery, the UE may reduce or disable some of its capability (e.g., CA and FeICIC). Any of these non-limiting examples may temporarily reduce or change the capability of the UE.

In some aspects of the disclosure, a UE and/or a network node can support multiple connectivity, and the capability information signaling per connection may dynamically consider the potential resource conflict among the connections. For example, if the UE declares the same UE capability information for more than one connection, configuration conflict between the connections may occur. In one particular example, the UE has established two RRC connections with the network, and reports being capable of three DL carrier aggregation (CA) capability for each RRC connection. However, the UE cannot actually support three DL CA on both RRC connections because the UE does not have the resources to support six DL CA in total simultaneously. Aspects of the present disclosure can mitigate such resource conflicts by dynamically reporting capability per connection that can be supported by the available resources.

In some aspects of the present disclosure, a UE can signal or report instantaneous UE capability information (IUCI) in various manners. For example, the UE may report its IUCI via PHY signaling, MAC PDUs, RLC PDUs, and/or RRC uplink control messages. When a network node receives the IUCI, the network node can take into account the instantaneous UE capability in its radio resource management (RRM)/scheduler function to configure the one or more connection(s) between the UE and the network to avoid resource allocation conflicts. Instantaneous UE capability information refers to the current or up-to-date capability of the UE during a predetermined period of time or at the reporting time. Therefore, the IUCI is different from static UE capability information that is not updated in response to changes of UE resources. In some aspects of the disclosure, the IUCI may indicate the UE's current capability for a certain transmission time interval (TTI) or TTIs (e.g., a current TTI or a next TTI), and the IUCI for the same connection may be different in different TTIs while the connection is maintained.

Figure 9:
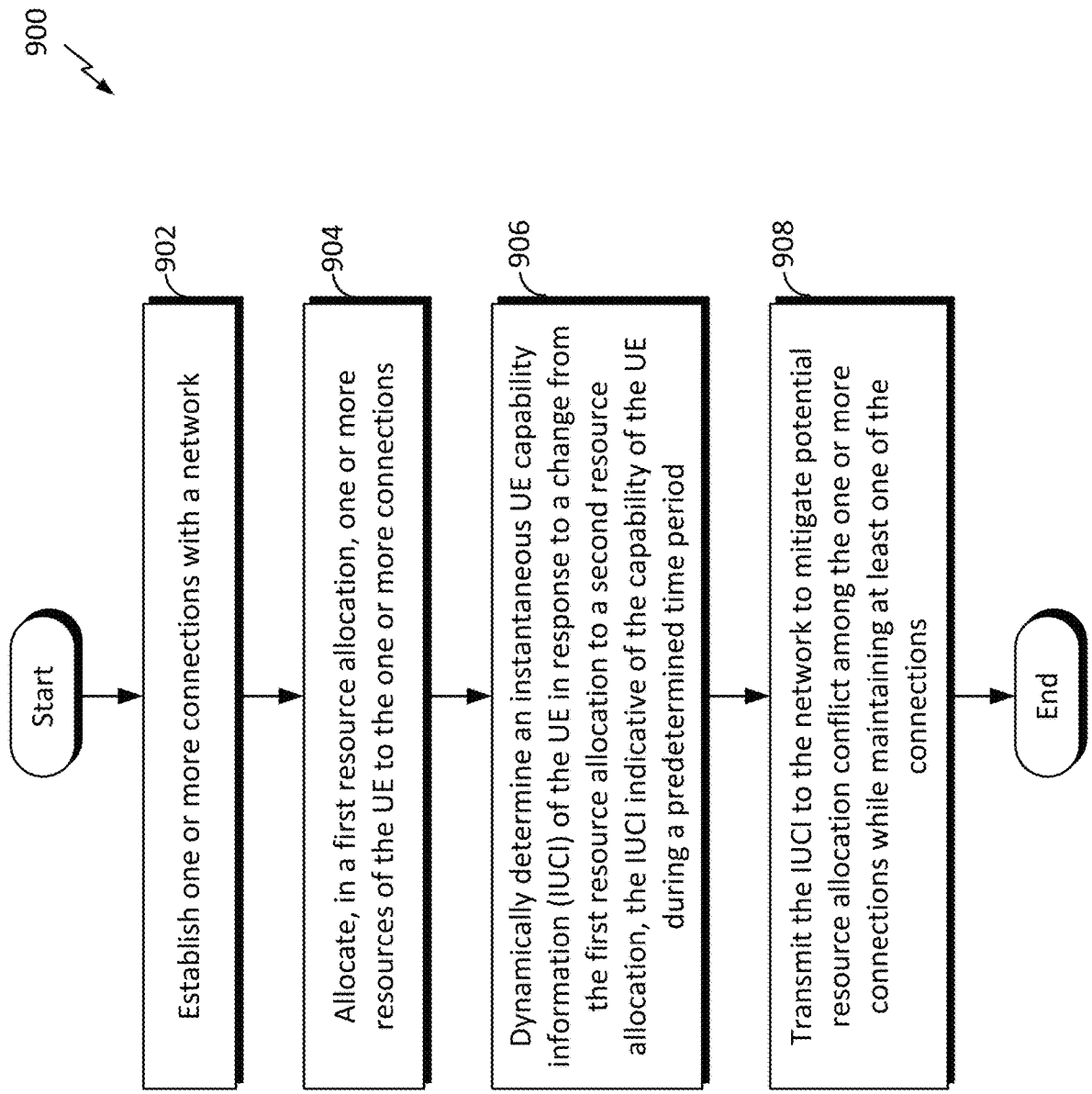
FIG. 9 is a flowchart illustrating an instantaneous UE capability information (IUCI) signaling method in accordance with aspects of the disclosure.

FIG. 9 is a flowchart illustrating an instantaneous UE capability information (IUCI) signaling method 900 in accordance with some aspects of the disclosure. The IUCI signaling method 900 may be performed using any of the UEs illustrated in FIGS. 1-3, 5-8, 12 and/or 13, or any suitable device. In one particular example, the method 900 may be performed by the UE 1202 of FIG. 12. At block 902, the UE 1202 establishes one or more connections with a network. For example, the UE 1202 may establish connections with one or more network nodes 1204, 1206, and 1208. In some examples, these network nodes may be a Node B, an eNB, an RNC, or an MME as illustrated in any of FIGS. 1-3 and 5-8. In some examples, one or more of the network nodes may be a Wi-Fi access point, a Bluetooth device, and/or a next generation network node (e.g., a 3GPP 5G network node).

The UE 1202 may establish the connections with the network nodes in accordance with any suitable procedures such as the RRC connection establishment procedures shown in FIGS. 7 and 8, and other generally known connection establishment procedures. In one particular example, the network node 1204 may be a UMTS/LTE network node, the network node 1206 may be a next generation (e.g., 5G) network node, and the network node 1208 may be a local area wireless access point (e.g., Wi-Fi access point).

At block 904, the UE allocates, in a first resource allocation, one or more resources to the one or more connections. Non-limiting examples of these resources are communication channels, carriers, physical channels, logical channels, processing power, processing at baseband, processors, radio frequency resources, resource blocks, radio transmission power, and memory space for buffering.

Figure 15:
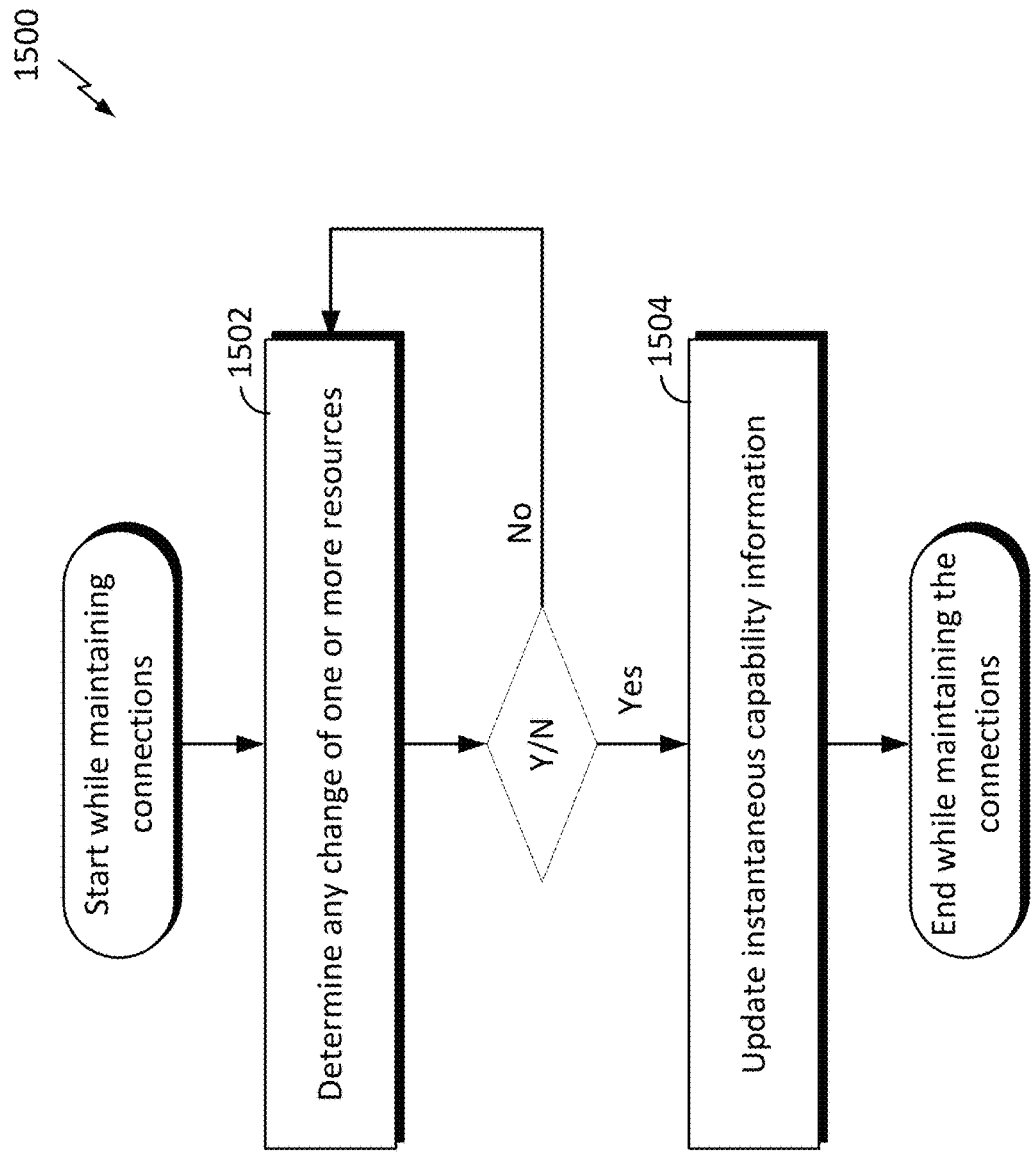
FIG. 15 is a flowchart illustrating a dynamic capability information update method operable at a UE or network node in accordance with an aspect of the disclosure.

At block 906, the UE dynamically determines an instantaneous UE capability information (IUCI) of the UE in response to a change from the first resource allocation to a second resource allocation. FIG. 15 is a flowchart illustrating a dynamic capability information update method 1500 in accordance with an aspect of the disclosure. The UE may utilize this dynamic capability information update method 1500 at block 906 to dynamically determine the IUCI. Referring to FIG. 15, at block 1502, the UE determines any change of its resource allocation (e.g., changing from the first resource allocation to the second resource allocation). If there is a change of resource allocation, at block 1504, the UE may determine and update its instantaneous capability information (e.g., IUCI). The updated instantaneous capability information may mitigate potential resource allocation conflict among the connections while maintaining at least one of the connections. The UE may perform the dynamic capability information update method 1500 while maintaining (i.e., not disconnecting or interrupting) one or more of its ongoing connections with the network.

The allocation of the resources may change due to any changes of the connections in operation or UE internal reasons. In some examples, when one connection utilizes more resources, less resources will be available for the other connections, and vice versa. In some examples, when an application of the UE is consuming more resources (e.g., processing power and memory), less resources will be available for the connections. In some examples, when the battery of the UE is below a certain threshold, the UE may provide less resources for the connections in order to conserve its battery power. The IUCI may indicate the capability of the UE during a predetermined time period. In some examples, the IUCI may indicate a suggested UE throughput, an allocation of bandwidth, a duplex mode, whether UE applies interference cancellation or not, inter-frequency and/or inter-RAT measurement availabilities, and so on in a predetermined time period or TTI(s). The UE may determine different IUCIs (e.g., IUCI1, IUCI2, IUCI3 in FIG. 12) for different connections. The IUCI may be different in different TTIs while the connection is maintained. The UE throughput may denote an achievable throughput by the UE. The allocation bandwidth may denote the bandwidth of the resources assigned to and used by the UE. The duplex mode may denote FDD or TDD, with or without half duplex operation. The inter-frequency and/or inter-RAT measurement availabilities may denote the availabilities of UE resources to perform inter-frequency and/or inter-RAT measurements with or without interruption to at least one of the ongoing connections.

In one specific example, the IUCI may indicate: "for current TTI, UE can support 5 Gbps (gigabit per second), 100 MHz BW (bandwidth) only DL." In another example, the IUCI may indicate supportable feature combinations in a TTI. In a certain TTI, for example, the UE may support only a single-carrier operation and/or cannot perform inter-frequency/inter-RAT measurement. In other examples, the UE may perform inter-frequency/inter-RAT measurement for a certain time period or TTI, and therefore the UE does not expect the network to schedule any data transmission for the time period. The IUCI may indicate an interference cancellation status so that the network scheduler can perform an outer loop link adaptation accordingly. In one example, the IUCI may indicate whether or not the UE supports interference cancellation in a certain TTI. In one example, the IUCI may indicate a certain time period (e.g., a valid or predetermined time period), and the network (e.g., a network node) considers such IUCI only for the indicated time period. That is, such IUCI is only considered by the receiving network node during the indicated valid time period. The IUCI may be determined or reported per TTI or a suitable number of TTIs while the connection is maintained. Such dynamic determination of the IUCI may mitigate or avoid potential resource allocation conflict among the connections.

The IUCI is not limited to the above-described examples. The IUCI can indicate any suitable capability information of the device that may be utilized by the network to configure, maintain, or update the connection(s) between the UE and the network node. Unlike generally known static and inflexible UE capability information update implementations, the dynamically updated IUCI of the present disclosure indicates a UE's up-to-date or current capability for supporting one or more connections while avoiding or reducing resource conflicts. The IUCI of the present disclosure may be dynamically determined in response to a change in the allocation of UE resources. Therefore, the determination and reporting of the IUCI is dynamic (non-static) and flexible. In some aspects of the disclosure, the UE may update its IUCI whenever there is a change in its resource allocation, and reports it to the network at any suitable time after connection establishment. Therefore, in different TTIs of an established connection, the IUCI may be different or updated.

At block 908, the UE transmits the IUCI to the network to mitigate potential UE resource allocation conflicts among the connections while maintaining at least one of the connections. In some aspects of the disclosure, the UE may transmit the IUCI as one or more PHY signals, medium access control (MAC) PDUs, radio link control (RLC) PDUs, PDCP PDUs, and/or radio resource control (RRC) messages. In some examples, the IUCI may be transmitted via control signaling (e.g., CQI or other physical channel control signals, a MAC control element (CE), an RLC status PDU, and a PDCP status PDU). In some examples, the IUCI may be transmitted via user packets (e.g., in-band signaling in an RLC data PDU, a PDCP data PDU, and/or a MAC PDU).

In some aspects of the disclosure, the UE may utilize PHY uplink control signaling to convey its IUCI to the network. In one particular example, the UE may use certain channel-quality indicator (CQI) values (e.g., a predetermined CQI value) to report the IUCI. For example, reserved CQI values may be used to indicate certain UE capability or profile such as "UE applies interference cancellation," "UE will not decode next PDCCH," and so on. In some examples, new PHY control signaling may be defined to transmit the IUCI.

In some aspects of the disclosure, the UE may utilize a MAC control element to convey the IUCI. For example, in an LTE network, some MAC structures carrying control information are called the MAC control element (MAC CE). There are several MAC CEs in the DL MAC and also several MAC CEs in the uplink MAC. This MAC CE structure may be implemented with a predetermined bit string in the LCID (Logical channel ID) field of the MAC header. For example, a predetermined MAC CE may be defined to report the IUCI. The MAC CE may include a special or predetermined LCID value plus an IUCI information field. In one specific example, if the condition LCID=IUCI is satisfied, then the network decodes the corresponding IUCI information field as the transmitted IUCI information. In some aspects of the disclosure, new MAC control signaling may be defined to signal the IUCI.

In some aspects of the disclosure, different signaling methods may be used to report the IUCI of the same connection. For example, PHY signaling may be utilized to indicate the IUCI applicable for a shorter time period (e.g., one TTI), and MAC PDUs may be used for a longer term IUCI reporting (e.g., multiple TTIs).

In some aspects of the disclosure, the UE may utilize RLC control PDUs to convey the IUCI. In one example, a predetermined RLC status PDU may be defined to signal the IUCI. In some examples, the IUCI may indicate the receiver side suggested throughput and amount of transmittable data. In some aspects of the disclosure, the UE may utilize a PDCP control PDU and/or a PDCP status PDU to convey the IUCI. In an LTE network, the PDCP protocol layer exists at the UE and eNB. More information on PDCP can be found in Release 12 of the 3GPP TS 36.323 document, which is incorporated herein by reference.

In some aspects of the disclosure, the UE may utilize RRC messages to convey or transmit the IUCI. For example, the UE may transmit an RRCConnectionReestablishmentRequest message to convey its IUCI. The RRCConnectionReestablishmentRequest message may indicate the configuration(s) that is/are not currently supported by the UE. For example, the IUCI can indicate that the UE may or may not support DL CA at a certain TTI. In some aspects of the disclosure, new RRC signaling messages may be defined to report the IUCI.

Figure 13:
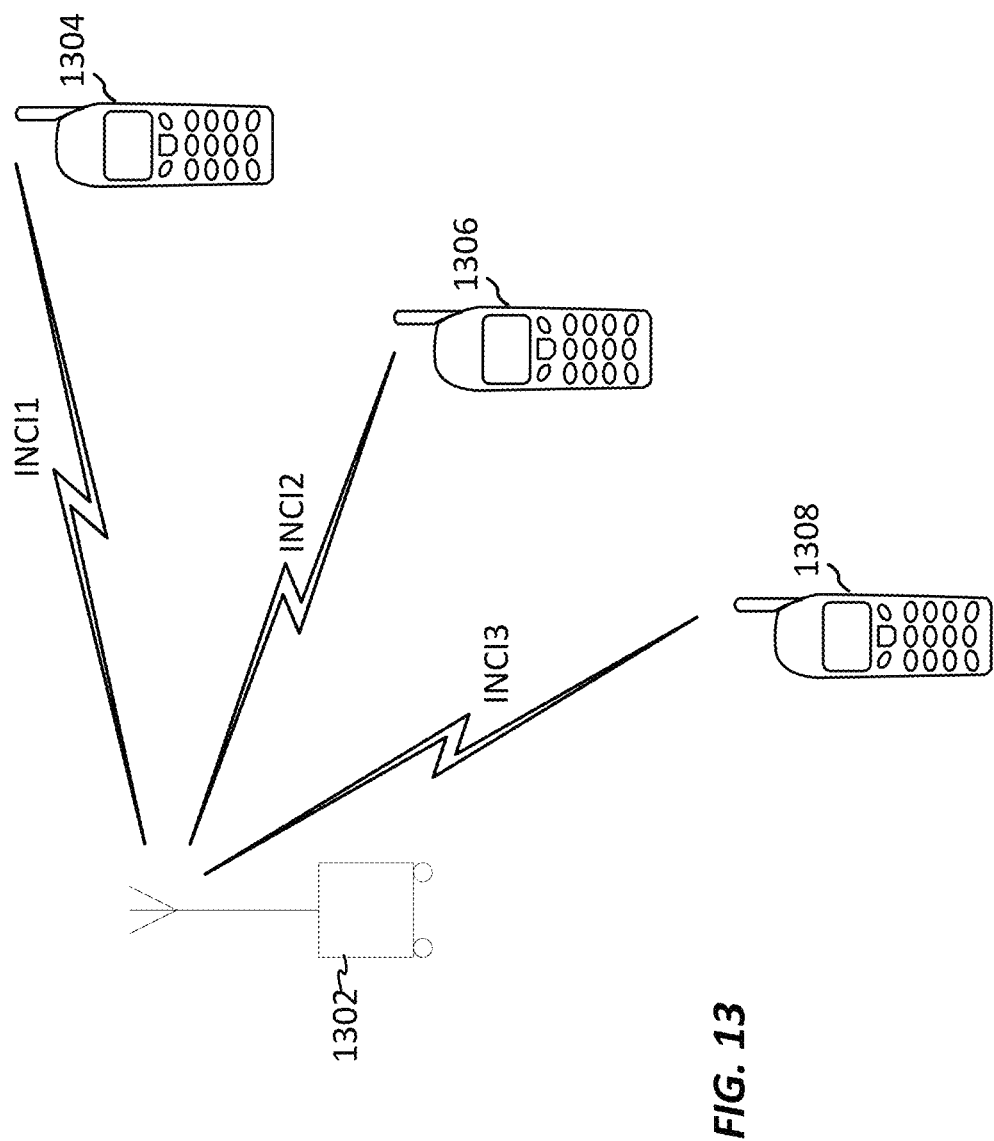
FIG. 13 is a diagram illustrating a network node in communication with multiple user equipments utilizing instantaneous capability information in accordance with an aspect of the disclosure.

In some aspects of the disclosure, a network node can signal instantaneous network capability information (INCI) to a UE using techniques similar to those described above for reporting IUCI. FIG. 13 is a drawing illustrating a network node 1302 in communication with a number of UEs in accordance with an aspect of the disclosure. The network node 1302 may be a Node B, an eNB, an RNC, or an MME as illustrated in any of FIGS. 1-3 and 5-8. In some examples, the network node 1302 can report its INCI via any one or more of PHY, MAC, RLC, and PDCP downlink control signaling similar to those described above. For example, the network node 1302 may transmit a first instantaneous network capability information (INCI1) to the UE 1304, a second instantaneous network capability information (INCI2) to the UE 1306, and a third instantaneous network capability information (INCI3) to the UE 1308 and so on. The capability information INCI1, INCI2, and INCI3 may be the same or different. Each INCI may be different in different time periods (e.g., TTIs) for the same connection due to changing resource allocation at the network node.

Figure 10:
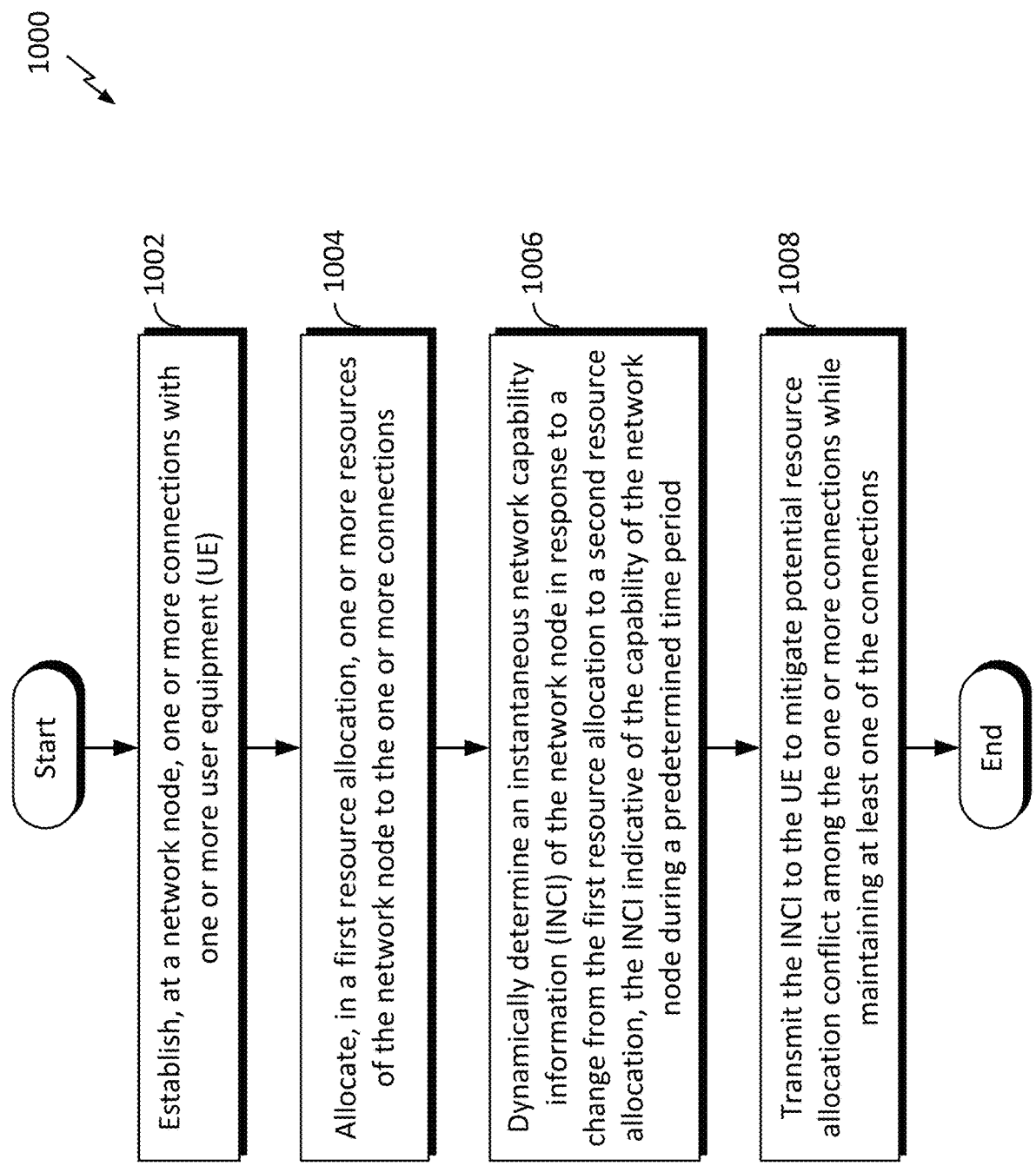
FIG. 10 is a flowchart illustrating an instantaneous network capability information (INCI) signaling method in accordance with aspects of the disclosure.

FIG. 10 is a flowchart illustrating an instantaneous network capability information signaling method 1000 in accordance with aspects of the disclosure. The method 1000 may be performed by any of the network nodes illustrated in FIGS. 1-3, 5-8, 12, and/or 13 or any suitable devices or access points. At block 1002, a network node establishes one or more connections with one or more UEs. In some examples, the UE may be any of the UEs illustrated in FIGS. 1-3, 5-8, 12, and/or 13. The network node may establish the connections in accordance with the RRC connection establishment procedures shown in FIGS. 7 and 8, or any suitable procedure.

At block 1004, the network node allocates, in a first resource allocation, one or more resources to the connections. Non-limiting examples of the resources include communication channels, carriers, physical channels, logical channels, processing power, processing at baseband, processors, radio frequency resources, resource blocks, radio transmission power, and memory space for buffering. At block 1006, the network node dynamically determines an instantaneous network capability information (INCI) of the network node in response to a change from the first resource allocation to a second resource allocation. In one example, the network may utilize the dynamic capability information update method 1500 of FIG. 15 to determine the INCI. The INCI (e.g., INCI1, INCI2, or INCI3 of FIG. 13) indicates the capability of the network node during a predetermined time period. The predetermined time period may be a current TTI, predetermined TTI(s), or any suitable time interval corresponding to the INCI. In some non-limiting examples, the INCI may indicate a suggested throughput, an allocation bandwidth, a duplex mode, and so on in a predetermined time period or TTI(s). In another example, the INCI indicates supported feature combinations or profile in a certain TTI or time interval. In some examples, the INCIs may be different for different connections in the same TTI. In some examples, the INCI may be different for the same connection in different TTIs.

The INCI is not limited to the above-described examples, the INCI may indicate any suitable network capability that is supported by the network node to maintain a connection with a UE. The determination and reporting of the INCI is dynamic (non-static) and flexible in response to changing resources allocation at the network node. In some aspects of the disclosure, the network node may update or change its INCI whenever there is a change in its resource allocation, and transmits it to the UE at any suitable time while maintaining the connection. In some examples, the reported INCI may be different or changed for different TTIs of the same connection.

At block 1008, the network node transmits the INCI to the UE to mitigate potential resource allocation conflict among the connections while maintaining at least one of the connections. In some aspects of the disclosure, the network node may transmit its INCI via any one or more of PHY signals, MAC PDUs, RLC PDUs, and/or PDCP PDUs, or any suitable methods.

In some aspects of the disclosure, the network node may transmit the INCI as one or more PHY downlink control signals. In some examples, new PHY control signaling may be defined to transmit the INCI.

In some examples, instantaneous network capability update using MAC or RLC signaling enables the network node to provide flow control for a longer term (e.g., more than one TTI). For example, the network node may use RLC in-band signaling to indicate less throughput, and in response, the UE keeps the indicated throughput until another RLC in-band signaling clears the throughput limitation. This solution may simplify the network node's scheduler implementation.

Figure 11:
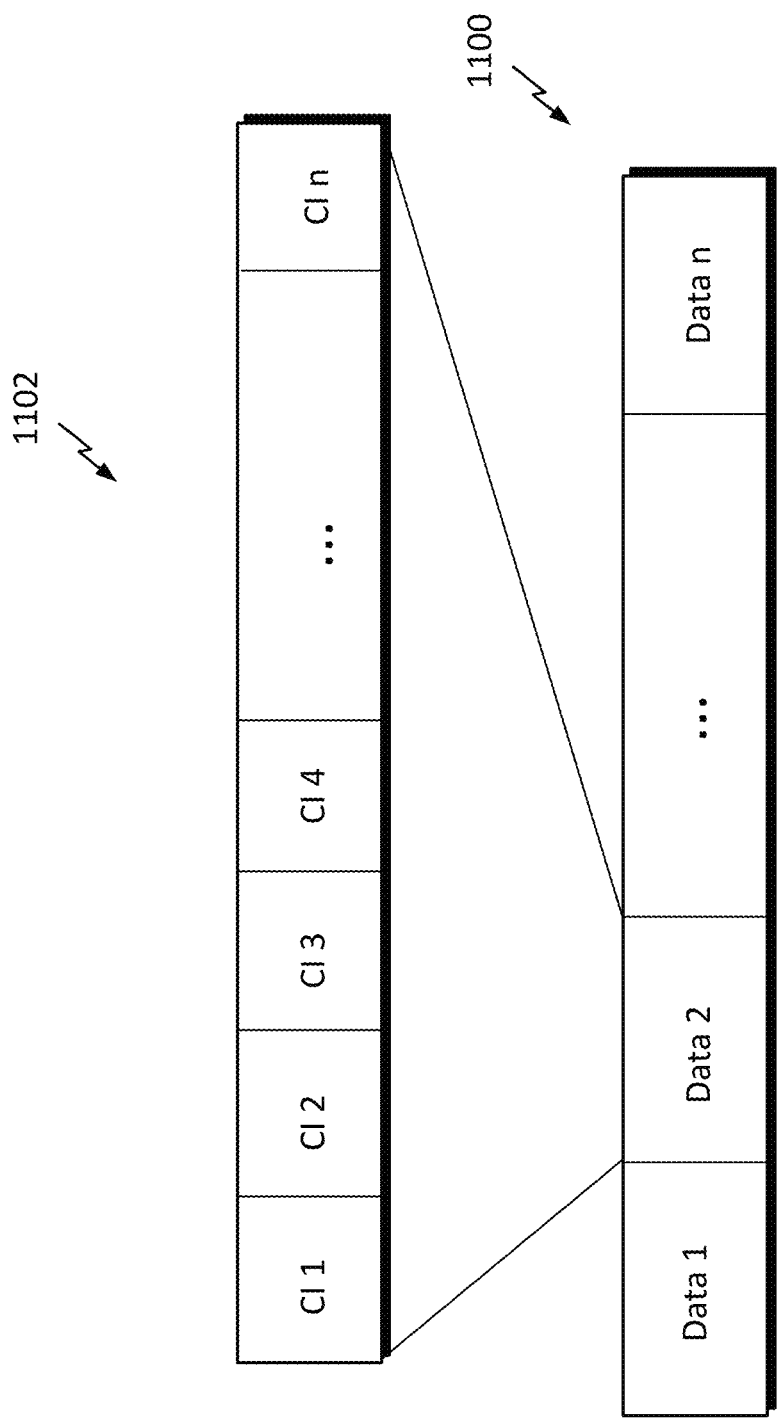
FIG. 11 is a diagram illustrating a plurality of data packets including instantaneous capability information in accordance with aspects of the present disclosure.
Figure 12:
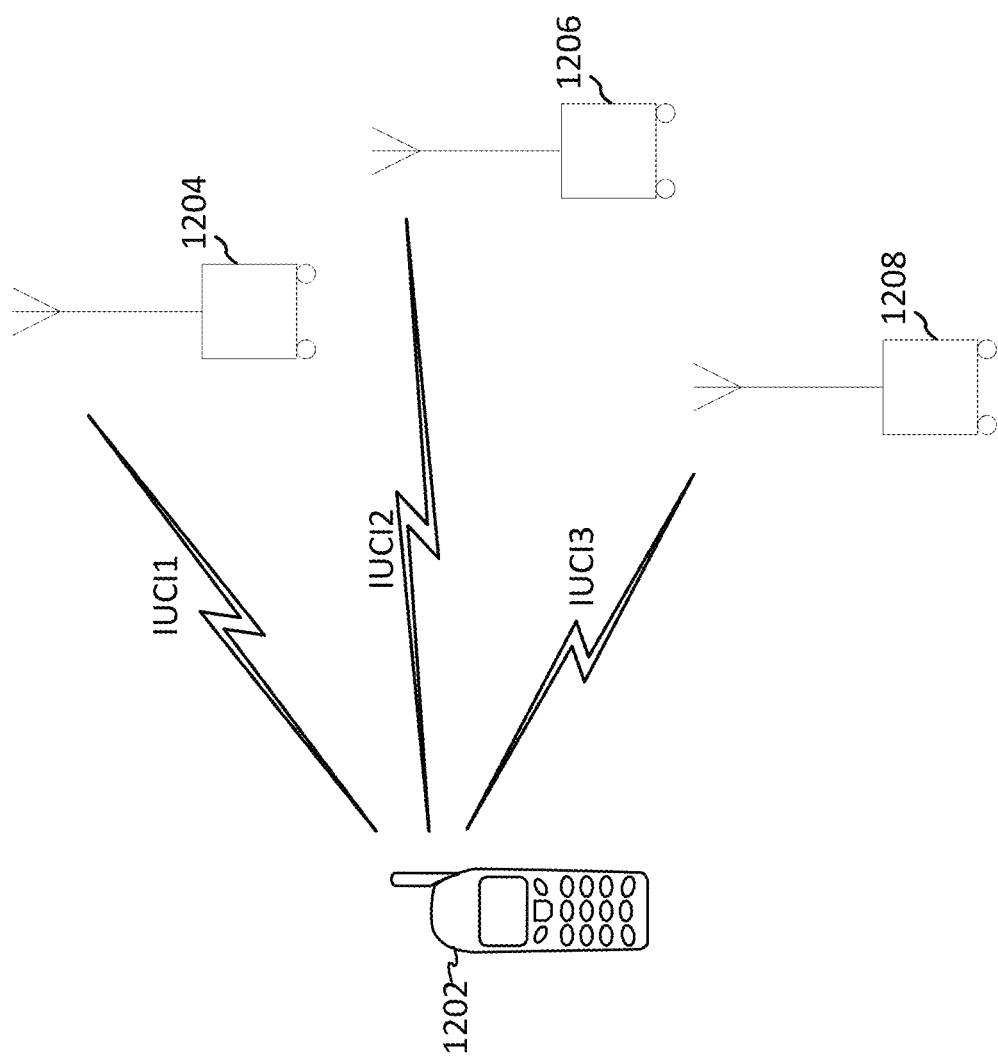
FIG. 12 is a diagram illustrating a user equipment in communication with multiple network nodes utilizing instantaneous capability information in accordance with an aspect of the disclosure.

FIG. 11 is a drawing schematically illustrating a plurality of data packets 1100 including instantaneous capability information in accordance with some aspects of the present disclosure. The data packets 1100 may be used to transmit the IUCI or INCI as described above. The data packets 1100 may be MAC PDUs, RLC PDUs, and/or PDCP PDUs. Each of the data packets 1100 (e.g., data 1, data 2, ... data n) may include one or more capability information 1102 (e.g., CI 1, CI 2, CI 3, CI 4, ... CI n). The capability information 1102 may be an IUCI or an INCI. In one particular example, one or more of the capability information 1102 may be used to indicate, for example, throughput, allocation bandwidth, duplex mode, measurement availability status, interference cancellation status, and/or valid time period. In other aspects of the disclosure, the data packets 1100 may have any other suitable formats. In some examples, different data packets 1100 may include different capability information 1102. In some examples, some data packets 1100 may include the same capability information 1102.

In one aspect of the disclosure, a UE may utilize the capability information 1102 to transmit an IUCI with an applicable time duration or valid time period (e.g., next N TTIs; N is a non-zero positive integer) so that the network node can take that into account when considering the received IUCI for the signaled time duration. In one aspect of the disclosure, a network node may utilize the capability information 1102 to transmit an INCI with an applicable time duration or valid time period (e.g., next N TTIs; N is a non-zero positive integer) so that the UE can take that into account when considering the received INCI for the signaled time duration.

Several aspects of a telecommunications system have been presented with reference to a W-CDMA/LTE system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of wireless communication operable at a user equipment (UE), comprising:
    establishing, at the UE, a plurality of connections with a network;
    allocating, in a first resource allocation, one or more resources of the UE to each of the plurality of connections;
    dynamically determining a plurality of different instantaneous UE capability information (IUCIs) of the UE in response to a change from the first resource allocation to a second resource allocation, each of the different IUCIs indicative of a capability of the UE that can be supported by the second resource allocation with respect to a corresponding one of the plurality of connections during a predetermined time period; and
    transmitting the different IUCIs, including a first IUCI as a physical layer (PHY) signal in a first time period and a second IUCI as a medium access control (MAC) protocol data unit (PDU) in a second time period, to the network to mitigate potential resource allocation conflict among the plurality of connections while maintaining at least one of the connections.

2. The method of claim 1, wherein the transmitting the different IUCIs comprises at least one of:
    transmitting the different IUCIs as one or more physical layer (PHY) signals;
    transmitting the different IUCIs as one or more medium access control (MAC) protocol data units (PDUs);
    transmitting the different IUCIs as one or more radio link control (RLC) PDUs; or
    transmitting the different IUCIs as one or more packet data convergence protocol (PDCP) PDUs.

3. The method of claim 1, wherein each of the different IUCIs comprises a predetermined channel-quality indicator (CQI) value configured to indicate the capability of the UE corresponding to the plurality of connections.

4. The method of claim 1, wherein each of the different IUCIs comprises a medium access control (MAC) control element configured to indicate the capability of the UE corresponding to the plurality of connections.

5. The method of claim 1,
    wherein the first time period is shorter than the second time period.

6. The method of claim 1, wherein the plurality of connections comprise a plurality of Radio Resource Control (RRC) connections.

7. The method of claim 1, wherein the dynamically determining the plurality of different IUCIs comprises:
    while maintaining at least one of the connections, determining a first IUCI in a first transmission time interval (TTI) and a second IUCI in a second TTI,
    wherein the first IUCI is different from the second IUCI, corresponding to a change in the allocation of the one or more resources.

8. The method of claim 1, wherein the one or more resources comprise at least one of communication channels, processing power, radio frequency resources, or a memory resource.

9. The method of claim 1, wherein each of the different IUCIs is configured to indicate a valid time period in which the IUCI is considered by the network.

10. The method of claim 1, wherein each of the different IUCIs comprises at least one of throughput, allocation bandwidth, duplex mode, measurement availability status, or interference cancellation status.

11. A user equipment (UE), comprising:
a communication interface configured to establish a plurality of connections with a network;
a memory comprising software; and
at least one processor operatively coupled to the communication interface and the memory,
wherein the at least one processor when configured by the software, comprises:
a resource control block configured to allocate, in a first resource allocation, one or more resources of the UE to each of the plurality of connections;
a capability determination block configured to dynamically determine a plurality of different instantaneous UE capability information (IUCIs) of the UE in response to a change from the first resource allocation to a second resource allocation, each of the different IUCIs indicative of a capability of the UE that can be supported by the second resource allocation with respect to a corresponding one of the plurality of connections during a predetermined time period; and
a capability update block configured to transmit the different IUCIs, including a first IUCI as a physical layer (PHY) signal in a first time period and a second IUCI as a medium access control (MAC) protocol data unit (PDU) in a second time period, to the network to mitigate potential resource allocation conflict among the plurality of connections while maintaining at least one of the connections.

12. The UE of claim 11, wherein the capability update block is configured to at least one of:
transmit the different IUCIs as one or more physical layer (PHY) signals;
transmit the different IUCIs as one or more medium access control (MAC) protocol data units (PDUs);
transmit the different IUCIs as one or more radio link control (RLC) PDUs; or
transmit the different IUCIs as one or more packet data convergence protocol (PDCP) PDUs.

13. The UE of claim 11, wherein each of the different IUCIs comprises a predetermined channel-quality indicator (CQI) value configured to indicate the capability of the UE corresponding to the plurality of connections.

14. The UE of claim 11, wherein each of the different IUCIs comprises a medium access control (MAC) control element configured to indicate the capability of the UE corresponding to the plurality of connections.

15. The UE of claim 11,
wherein the first time period is shorter than the second time period.

16. The UE of claim 11, wherein the plurality of connections comprise a plurality of Radio Resource Control (RRC) connections.

17. The UE of claim 11, wherein the capability determination block is configured to:
while maintaining at least one of the connections, determine a first IUCI in a first transmission time interval (TTI) and a second IUCI in a second TTI,
wherein the first IUCI is different from the second IUCI, corresponding to a change in the allocation of the one or more resources.

18. The UE of claim 11, wherein the one or more resources comprise at least one of communication channels, processing power, radio frequency resources, or a memory resource.

19. The UE of claim 11, wherein each of the different IUCIs is configured to indicate a valid time period in which the IUCI is considered by the network.

20. The UE of claim 11, wherein each of the different IUCIs comprises at least one of throughput, allocation bandwidth, duplex mode, measurement availability status, or interference cancellation status.

* * * * *